Figure 1:
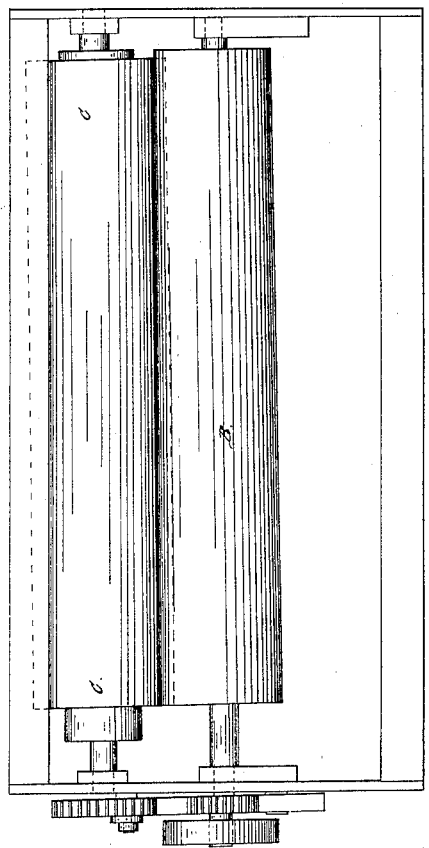
Figure 3:
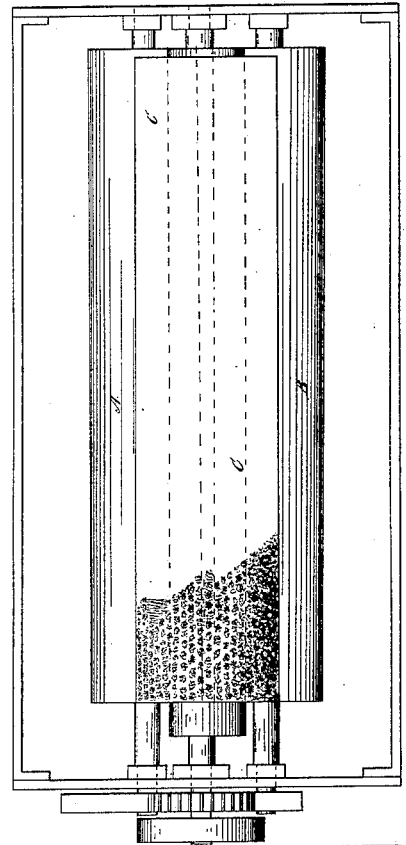
Figure 2:
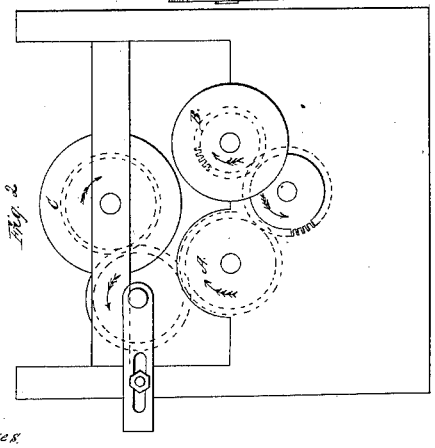
Figure 4:
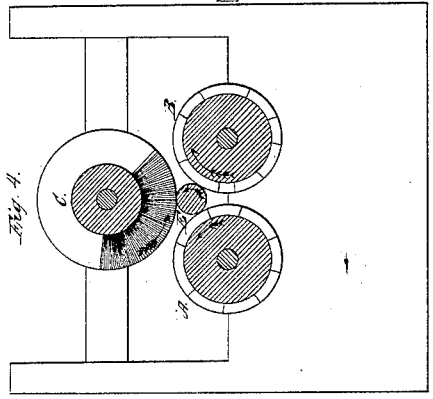

Cox & Miller,
Cork Machine,

N°24,841.    Patented July 19, 1859.

Witnesses
J. H. Maynard
George H. Mott

Inventor.
Henry F. Cox
Alex. Miller
by their Attorney
J. P. Pirsson

UNITED STATES PATENT OFFICE.

HENRY F. COX, OF JERSEY CITY, NEW JERSEY, AND A. MILLAR, OF NEW YORK N. Y.; SAID MILLAR ASSIGNOR TO SAID COX.

MACHINE FOR POLISHING CORKS.

Specification of Letters Patent No. 24,841, dated July 19, 1859.

*To all whom it may concern:*

Be it known that we, HENRY F. Cox, of Jersey City, Hudson county, New Jersey, and ALEXANDER MILLAR, of the city, county, and State of New York, have invented certain new and useful Improvements in Machinery for Polishing and Finishing Corks; and we do hereby declare that the following is a full, clear, and exact description of the same, reference being made to the annexed drawing, making a part of this specification, which is fully described herein.

Similar letters indicate similar parts throughout the figures.

In the action of cutting tools upon cork-wood-bark different degrees of smoothness are produced by different velocities of the cutting tool. The higher the velocity the rougher will be the finish. As a consequence of this peculiarity, corks are generally cut by the slow and tedious process of paring each block by hand separately into shape, and so as to leave a smooth and polished surface. Machine-made corks have the advantage of being more uniform and accurate in shape than hand-made, but as the cutting tools of all seem to require rapid motion over the surface of the cork in order to produce the corks cheaply and rapidly, as well as to insure accuracy of cutting, the result is an inferior article in consequence of the rough surface left thereby.

Our invention lies in a method of giving to machine-made corks a finishing polish whereby the merchantable quality of the same shall be improved.

Our cork-polisher consists of a system of roughened rollers and brushes so constructed to act upon the cylindrical portion of the cork as to leave a smooth velvety surface thereon, the ends being in like manner polished at a second operation by a revolving table or plate with a similar surface.

In the drawings the machine is shown as having two roughened-surface rollers, placed side by side, as seen at A, B, in the several figures. These rollers have their roughened surfaces formed of "pumice stone," which we have found to be a material particularly adapted to the purpose from its possessing the quality of wearing slowly during its action upon the cork. The tendency of other materials is to fill up by the adhesion of fine particles of the cork, and thus they soon lose their ability to affect the surface mechanically. In the angle above these rollers we place a dusting brush, consisting of bristles, which, revolving rapidly over the cork, cleans and assists in polishing the same. The brush-cylinder is shown at C. The cork after it has been roughly cut by a machine is placed in at one end, and rests between the rollers A and B, with the brush upon top and as seen in Figure IV at E. In order that the rollers may grind upon the surface of the cork they are made to revolve with dissimilar speeds and in contrary directions, and the brush-cylinder has a greater speed than either. To cause the cork to pass from one end to the other the cylinders are placed on an incline, as shown in Fig. I.

The operation is as follows:—The corks of a particular lot to be smoothed and polished should be nearly of a size. The rollers and brush being in motion with a proper velocity, the operator inserts a cork between the same at the end which is highest. It will be made to revolve by the conjoint action of the three, but, as these all move with different speeds, every portion of the cork as it turns will be subject to frictional and grinding action. Thus, while slowly descending the inclined plane upon which the rollers are set, it will receive its final smoothing and polish, being discharged at the opposite end to that at which it entered. Another rough cork is then introduced, and so the operation goes on, the speed being such that a cork is discharged finished about as fast as they can be readily introduced into the machine. Whenever a different sized lot of corks is to be polished, the brush cylinder is set to or from the others, as the case may require, by adjusting the axis of the same, which sets in movable boxes on cross frames for that purpose. If the sheet of cork out of which the "rounds" are cut had been smoothed before being submitted to the cutting machine, the article will have been finished by passing through the polisher. On the other hand, if the rounds were cut from rough blocks, the ends will have to be polished, and this may be done either before or afterward by means of a flat-surfaced revolving table of pumice stone or other equivalent rough surface, the ends of the cork being pressed against which, will at once smooth it.

We have described pumice-stone as that material we prefer, but other substances will answer provided they possess the property of keeping a proper degree of roughness. Of this character would be a surface made of pulverized glass, emery, crystals, &c., applied to the surface of the rollers after the manner of making sand-paper, or the said rollers might be made of metal with roughened surfaces grooved or cut so as to clear themselves. Therefore we do not confine ourselves to making the rollers of pumice stone alone.

We claim as our invention—

The cork polishing machine, consisting of a series of rollers roughened by a surface of pumice stone or equivalent abrading material, and a brush or brushes acting in conjunction to polish the cylindrical portion of machine-made corks, as described.

In testimony whereof we have hereunto subscribed our names.

HENRY F. COX.
ALEXANDER MILLAR.

Witnesses:
J. P. PIRSSON,
S. H. MAYNARD.